United States Patent
Okada et al.

(10) Patent No.: US 7,006,326 B2
(45) Date of Patent: Feb. 28, 2006

(54) SINGLE POLE TYPE RECORDING HEAD WITH TAPERED EDGES

(75) Inventors: Tomohiro Okada, Odawara (JP); Yasutaka Nishida, Hiratsuka (JP); Masafumi Michizuki, Chigasaki (JP); Hisashi Takano, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/768,104

(22) Filed: Feb. 2, 2004

(65) Prior Publication Data

US 2004/0150910 A1    Aug. 5, 2004

Related U.S. Application Data

(62) Division of application No. 09/920,648, filed on Aug. 3, 2001, now Pat. No. 6,710,973.

(30) Foreign Application Priority Data

| Sep. 18, 2000 | (JP) | ............................. 2000-286842 |
| Oct. 23, 2000 | (JP) | ............................. 2000-328405 |

(51) Int. Cl.
*G11B 5/127* (2006.01)

(52) U.S. Cl. .................................................... 360/125
(58) Field of Classification Search ......... 360/125–126
See application file for complete search history.

(56) References Cited

U.S. PATENT DOCUMENTS

| 4,258,401 | A | * | 3/1981 | Yoshida et al. ............. 360/125 |
| 4,441,131 | A | * | 4/1984 | Osanai ........................ 360/119 |
| 4,725,909 | A | * | 2/1988 | Kawai ......................... 360/126 |
| 5,801,910 | A |   | 9/1998 | Mallary |
| 6,504,675 | B1 |  | 1/2003 | Shukh et al. |
| 6,538,844 | B1 | * | 3/2003 | Takano et al. .............. 360/122 |
| 6,631,054 | B1 |  | 10/2003 | Miyazaki et al. |
| 6,693,768 | B1 | * | 2/2004 | Crue et al. .................. 360/126 |

FOREIGN PATENT DOCUMENTS

| JP | 60-136015 | 12/1983 |
| JP | 3-209609 | 1/1990 |
| JP | 10-320720 | 5/1997 |
| JP | 11-250416 | 2/1998 |
| JP | 2001-236605 | 2/2000 |

* cited by examiner

*Primary Examiner*—A. J. Heinz
(74) *Attorney, Agent, or Firm*—Reed Smith LLP; Stanley P. Fisher, Esq.; Juan Carlos A. Marquez, Esq.

(57) ABSTRACT

A magnetic head for perpendicular recording without writing from the lateral sides of a mains pole and without erasing data on adjacent tracks. A magnetic disk storage apparatus using the magnetic head. The lateral side of the main pole of a magnetic head for perpendicular recording may have an inverted tapered shape obtained by forming a groove as a track portion to an inorganic insulating layer and then forming a magnetic layer and then flattening the upper surface. A leading edge, a trailing edge, or both lateral edges of the magnetic head may be tapered. The taper may be either smooth and linear or curved in profile.

12 Claims, 20 Drawing Sheets

FIG. 12A
STEP OF FORMING RESIST PATTERN

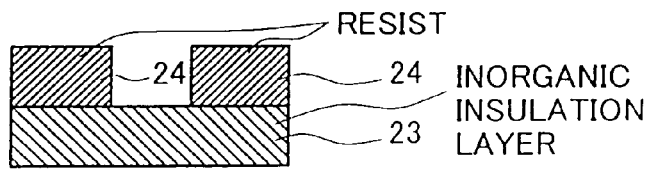

RESIST
24 INORGANIC INSULATION LAYER
23

FIG. 12B
STEP OF ETCHING ALUMINA

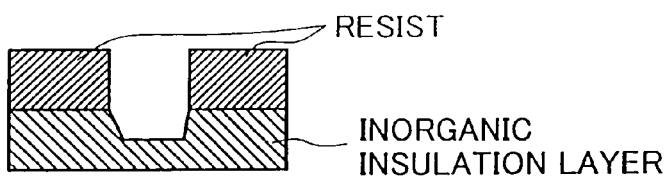

RESIST
INORGANIC INSULATION LAYER

FIG. 12C
STEP OF REMOVING RESIST

INORGANIC INSULATION LAYER

FIG. 12D
STEP OF FORMING STOPPER LAYER

25
INORGANIC INSULATION LAYER

FIG. 12E
STEP OF FORMING MAGNETIC LAYER

26
INORGANIC INSULATION LAYER

FIG. 12F
STEP OF FLATTENING UPPER SURFACE

MAIN POLE 1

INORGANIC INSULATION LAYER

FIG. 21A  FIG. 21B (a) STEP OF RESIST PATTERNING

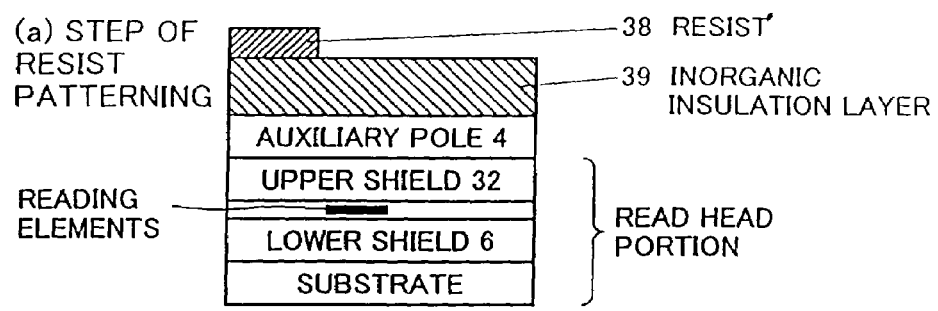

38 RESIST
39 INORGANIC INSULATION LAYER
AUXILIARY POLE 4
READING ELEMENTS — UPPER SHIELD 32
LOWER SHIELD 6
SUBSTRATE
} READ HEAD PORTION (b) STEP OF ETCHING OF INORGANIC INSULATION LAYER

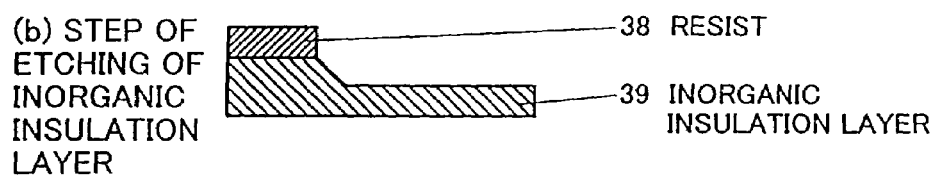

38 RESIST
39 INORGANIC INSULATION LAYER (c) STEP OF RESIST REMOVING

39 INORGANIC INSULATION LAYER (d) STEP OF RESIST PATTERNING

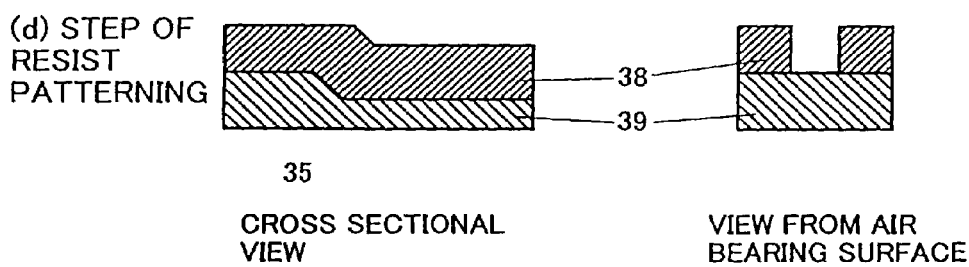

38
39

35

CROSS SECTIONAL VIEW

VIEW FROM AIR BEARING SURFACE

FIG. 22A            FIG. 22B
(e) STEP OF DEPOSITION OF MAGNETIC LAYER
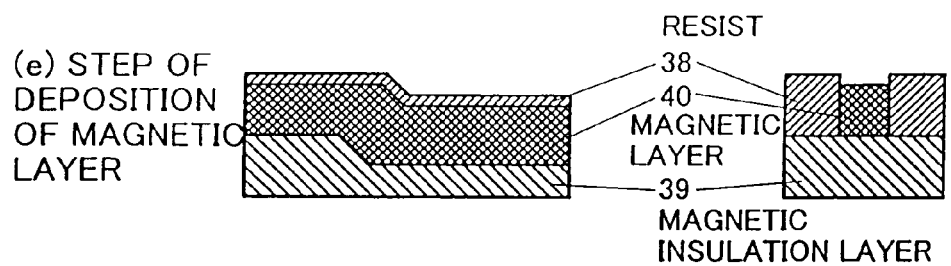
RESIST 38
40
MAGNETIC LAYER
39
MAGNETIC INSULATION LAYER
(f) STEP OF RESIST REMOVING
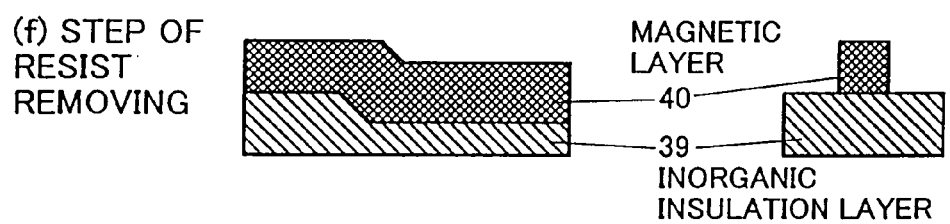
MAGNETIC LAYER
40
39
INORGANIC INSULATION LAYER
(g) STEP OF SURFACE FLATTENING
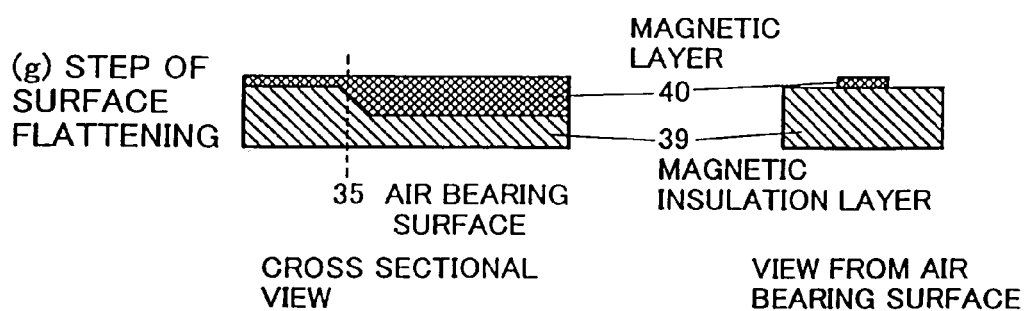
MAGNETIC LAYER
40
39
MAGNETIC INSULATION LAYER
35 AIR BEARING SURFACE
CROSS SECTIONAL VIEW
VIEW FROM AIR BEARING SURFACE (a) STEP OF RESIST PATTERNING — 38 RESIST, 39 INORGANIC INSULATION LAYER (b) STEP OF DEPOSITION OF INORGANIC INSULATION LAYER (c) STEP OF RESIST REMOVING (d) STEP OF RESIST PATTERNING (e) STEP OF DEPOSITION OF MAGNETIC LAYER (f) STEP OF RESIST REMOVING (g) STEP OF SURFACE FLATTENING

21 AIR BEARING SURFACE

CROSS SECTIONAL VIEW        VIEW FROM AIR BEARING SURFACE

SINGLE POLE TYPE RECORDING HEAD WITH TAPERED EDGES

PRIORITY TO FOREIGN APPLICATIONS

This application is a Divisional of nonprovisional application Ser. No. 09/920,648 filed Aug. 3, 2001 now U.S. Pat. No. 6,710,973. Priority is claimed based on U.S. application Ser. No. 09/920,648 filed Aug. 3, 2001, which claims the priority of Japanese applications 2000-286842 filed on Sep. 18, 2000 and 2000-328405 filed on Oct. 23, 2000.

BACKGROUND OF THE INVENTION

1. Field of the Invention

This invention concerns a thin layer magnetic head used for recording and reproduction, for example, in a magnetic disk storage apparatus and a magnetic disk storage apparatus mounting the magnetic head.

2. Description of the Background

In a magnetic disk storage apparatus, data on the recording media is read and written by a magnetic head. In order to increase the recording capacity per unit area of the magnetic disk, it is necessary to increase the area recording density. However, the area recording density of existing in-plane recording systems can not be increased as the length of bits to be recorded is decreased because of thermal fluctuation in the magnetization of the media.

A perpendicular recording system which records magnetization signals in a direction perpendicular to a medium is adapted to address this problem. In the perpendicular recording system, a magnetoresistive head ("MR head") and a giant magnetoresistive head ("GMR head") with a larger read output than non-perpendicular systems can be used for reading. However, a single pole head must to be used for the writing head in these systems. With perpendicular recording, it may be necessary to improve the track density and the linear recording density in order to improve the recording density. To improve the track density, the track width of the magnetic head is decreased and formed with higher accuracy.

In a perpendicular recording system, the shape of the main pole of the single pole type recording head has a significant effect on the magnetization pattern of the media. Specifically, the shape of the upper end face of the main pole, which is the end face of the main pole on the side opposite to the MR head (on the trailing side), greatly affects the shape of the magnetization pattern of the media. For example, JP-10-320720/1998 discloses the structure of a single pole type head having a main pole of a trapezoidal shape flattened at the upper end face and wider on the side of the MR head.

However, in the description in JP-10-320720/1998, a description is made of side recording tracks defined by the slope on both sides of the trapezoidal shape. These side recording tracks reduce cross talk with adjacent recording tracks, however, they hinder the improvement of the track density which therefore hinders any improvement in the area recording density. In such a magnetic disk storage apparatus, a skew angle is formed when the magnetic head scans from the inner circumference to the outer circumference of a disk, in which the trapezoidal pole shape erases signals on adjacent tracks. JP-10-320720/1998 has no specific descriptions about the pole forming method.

By using a polishing method, the upper surface of the main pole (second pole) can be flattened. However, when a polishing method such as chemical mechanical polishing (CMP) is used, it is difficult to control the layer thickness which hinders the accuracy of the layer thickness. The thickness may vary by as much as about ±0.5 μm. This inaccuracy scatters the layer thickness of the main pole, thereby causing scattering in the intensity of the magnetic field from the main pole. Accordingly, it is preferred to adopt a flattening method for the upper surface of the main pole having improved controllability (accuracy) for the layer thickness.

In view of the above, the present invention preferably provides a magnetic head for perpendicular recording having a main pole of a shape with no side recording which does not erase signals on adjacent tracks caused by a skew angle. The invention also includes a manufacturing method of the magnetic head and a magnetic disk storage apparatus mounting the magnetic head for perpendicular recording.

SUMMARY OF THE INVENTION

A single pole type recording head for perpendicular recording in accordance with at least one preferred embodiment of the present invention comprises a first pole (auxiliary pole), a second pole (main pole) and a gap layer formed between the first and second poles in which the width of the first pole opposed to the gap layer is larger than the width of the second pole opposed to the gap layer. When defining the surface of the second pole opposed to the gap layer as a "lower layer" and the surface of the second pole on the side opposite the lower surface (that is, on the trailing side) as an "upper surface" which is flat, the width (B) of the lower surface is preferably smaller than the width (A) of the upper surface in the second pole. Further, an angle formed between the upper surface and both lateral (side) surfaces of the second pole is an acute angle. In accordance with this invention, a magnetic disk storage apparatus is formed by mounting the magnetic head.

In at least one preferred embodiment, the second pole has a shape in which the size changes continuously (i.e., linearly) from the width for the upper surface to the width for the lower surface of the second pole, and each lateral side of the second pole is desirably formed as a slope. In a preferred embodiment, the angle formed between the upper surface and both lateral sides to the upper surface of the second pole is within a range of approximately 60° to 90°. Further, the upper surface of the second pole may be characterized with a "flatness" that varies by less than about 30 nm between the end and the central portion in the upper surface.

In accordance with this invention, a second pole (main pole) is preferably formed by a process characterized by the following sequential steps: forming a resist pattern on an inorganic insulating layer; etching the inorganic insulating layer using the resist pattern as a mask thereby forming a groove having a bottom surface larger than the upper surface and having a slope portion; removing the resist pattern; forming a magnetic layer on the inorganic insulating layer including the groove; and flattening the magnetic layer. The second pole (main pole) may also be formed by a method, following the step of removing the resist pattern, including the sequential steps of: forming a stopper layer for chemical mechanical polishing (CMP) on the inorganic insulating layer; forming a plated underlayer on the stopper layer; plating a magnetic layer on the plated underlayer; and polishing the magnetic layer by chemical mechanical polishing (CMP).

Alternatively, the second pole (main pole) may also be formed by a method, following the step of removing the resist pattern, including the sequential steps of: forming an etching stopper layer on the inorganic insulating layer;

forming a plated underlayer on the stopper layer; plating a magnetic layer on the plated underlayer; and flattening the magnetic layer by etching using plasmas.

The inorganic insulating layer is preferably a single layer comprising $Al_2O_3$, AlN, SiC, $Ta_2O_5$, TiC, $TiO_2$ or $SiO_2$, or a laminate or mixed layer comprising two or more of the compounds described above. The magnetic layer constituting the second pole is preferably made of a material having a saturation magnetic flux density (Bs) of at least 1.5 tesla (T). The stopper layer for chemical mechanical polishing (CMP) may be a single layer comprising C, Ta, Mo, Nb, W or Cr, or a laminate layer or an alloy layer comprising the elements described above. The etching stopper layer may be a single layer comprising Cr, Ni, Au, Pt, Pd, Ru, Rh, Cu, Ag, Tc, Re, Os or Ir or a laminate layer or an alloy layer comprising the elements described above.

In order to cope with a narrowed track of the recording head, the width (A) for the upper surface of the second pole (main pole) is preferably 0.3 µm or less.

In the present invention, the second pole (main pole) of the magnetic head for perpendicular recording has a structure shape that can preferably prevent writing to and erasing adjacent tracks caused by the skew angle in the lateral sides of the second pole. Initially, for preventing writing from the lateral side of the second pole into the adjacent tracks, the shape of the second pole as viewed from the magnetic recording medium opposed surface (air bearing surface) may be an inverted tapered shape. It is also possible by forming the shape of the second pole in this way to prevent a portion of the second pole from extending over the area of adjacent tracks and erasing the data on the adjacent tracks because of the skew angle.

The tapered angle of the inverted tapered shape depends on the skew angle, and the angle θ relative to the normal line direction to the upper surface of the second pole is preferably defined as 0°<θ≦30°. That is, the angle between the upper surface and both of the lateral sides to the upper surface of the second pole is preferably set within a range of 60° to 90°. Further, the shape of the tapered portion is preferably changed linearly from the width (A) for the upper surface to the width (B) for the lower surface.

Because the tapered angle thus formed may result in a lowering of the magnetic field intensity from the main pole, it may be necessary to increase the saturation magnetic flux density (Bs) of the main pole to at least Bs=1.5 T (tesla). Materials to accomplish this may include, for example, FeNi and CoNiFe.

As described above, both of the problems of writing into the sides and erasure of data on the adjacent tracks can be addressed by making the shape of the lateral sides of the main pole as viewed from the air bearing surface into an inverted tapered shape. Further, the upper surface of the main pole can be provided with favorable controllability for the layer thickness while flattening the upper surface by preliminarily etching a groove into the inorganic insulating layer, forming a magnetic layer in the groove and then removing any unnecessary portion by a polishing method or etching. For the inorganic insulating layer, a single layer comprising $Al_2O_3$, AlN, SiC, $Ta_2O_5$, TiC, $TiO_2$ or $SiO_2$, or a mixed or a laminate layer comprising the compounds as are known in the art can be adopted.

The flatness for the surface of the main pole is preferably such that a difference in thickness (flatness or smoothness) between the end and the central portion of the main pole is no more than about 30 nm. Chemical mechanical polishing (CMP) or a similar method can be used for the polishing method, and the controllability of the layer thickness can be improved by forming a stopper layer for CMP before polishing. As the stopper layer, a single layer comprising C, Ta, Mo, Nb, W or Cr or a laminate layer or an alloy layer comprising the element can be used.

When flattening is conducted by an etching method, the controllability of the layer thickness can be improved by forming an etching stopper layer before etching. As the etching stopper layer, a single layer comprising Cr, Ni, Au, Pt, Pd, Ru, Rh, Cu, Ag, Tc, Re, Os or Ir, or a laminate layer or an alloy layer containing the element is preferred. Since the track width can be determined as the size of the resist pattern formed initially, the present method can preferably improve the accuracy for the fabrication of the track width and may be particularly effective when a magnetic head with a track width of 0.3 µm or less is formed.

Fabricating the shape of the main pole in an inverse tapered shape as described above may cause additional problems in the magnetic head. FIG. 1A shows a schematic view of the magnetic head of one embodiment of the invention, as viewed from the air bearing surface. In FIG. 1A, α is an angle formed between the oblique side of the trapezoidal main pole 1 and the track running direction. When the shape of the air bearing surface of the main pole is made trapezoidal, the recording magnetic field density is decreased. FIG. 1B shows the relationship between the maximum magnetic intensity of the main pole having a trapezoidal air bearing surface and the angle α. It can be seen in FIG. 1B that the magnetic field intensity decreases as α increases.

Further, JP-12-76333/2000 describes a technique of preventing erasure of data on adjacent tracks by removing a portion of the magnetic pole of the writing head thereby reducing the extension of the magnetic pole to the adjacent tracks. However, the magnetic field intensity of the head is also decreased in this case. Because the problem of thermal fluctuation becomes non-negligible as the size of the recording pit decreases, the coercive force of the medium tends to be increased as a countermeasure for thermal fluctuation. Since the recording magnetic field of the head is required to have a sufficient size to be capable of conducting recording to the medium, a decrease in the recording magnetic field intensity is disadvantageous to any improvement of the area recording density.

The erasure of data on adjacent tracks caused by the skew angle may be addressed without decreasing the recording magnetic field intensity by shaping the single pole type recording head so as to have a slope at the upper end of the main pole. In the single pole type recording head according to the present invention, the surface of the main pole situated "upstream" in the rotational direction of a recording medium opposed by the writing head, (that is, on the leading side) is slanted relative to the air bearing surface of the main pole. In other words, a tapered surface is formed at the upper end of the main pole. When the tapered surface is formed as described above, the magnetic recording intensity generated may be increased when compared with a similar device without such a taper.

In addition to the increase in the recording magnetic field, the generated recording magnetic field can be concentrated or focused by optimizing the slant of the tapered surface to the air bearing surface of the main pole. Specifically, the angle of the tapered surface relative to the main pole air bearing surface (hereinafter referred to as "the angle at the upper end of the main pole") is defined as between 45° and 75°. The tapered surface may also be disposed on the trailing side instead of the leading side of the main pole. Further, the tapered surface may be disposed on both the trailing side and the leading side.

Manufacturing methods for the main pole having a tapered surface include at least the following three methods. A first manufacturing method preferably comprises the following successive steps: forming a resist pattern on an inorganic insulating layer; etching the inorganic insulating layer using the resist pattern as a mask thereby forming a slope; removing the resist pattern; forming a resist pattern on the inorganic insulating layer; forming a magnetic layer on the inorganic insulating layer; removing the resist pattern; and a step of polishing to flatten the magnetic layer. A polishing method such as chemical mechanical polishing or other appropriate methods may be used.

A second manufacturing method preferably includes the sequential steps of: forming a tapered surface by a so-called lift off method which comprises forming a resist pattern on an inorganic insulating layer, sputtering the inorganic insulating layer and removing the resist pattern, the inorganic insulating layer deposited thereto thereby forming a slope; forming a resist pattern on the inorganic insulating layer forming a magnetic layer on the inorganic insulating layer; removing the resist pattern; and polishing to flatten the magnetic layer.

A third manufacturing method preferably comprises the steps of forming a resist pattern on a magnetic layer and then etching the magnetic layer using the resist pattern as a mask to thereby form a slope.

By manufacturing the main pole as described above, it may be possible to provide a single magnetic pole type recording head that does not erase data on adjacent tracks, while preventing a decrease in the magnetic field intensity. Further, it may be possible to provide a magnetic recording apparatus with a higher area recording density that is superior in thermal fluctuation resistance to conventional apparatuses. This apparatus may be used in a longitudinal recording system by mounting a double layered perpendicular medium having a soft magnetic underlayer and a single pole type recording head.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 12 is a schematic view of a process for forming a main pole according to the present invention;

FIG. 21 is a schematic view of a process for forming a main pole of a single pole type recording head in process steps (a)–(d) in cross-section (21A) and viewed from the air bearing surface (21B);

FIG. 22 is a schematic view of a process for forming a main pole of a single pole type recording head in continued process steps (e)–(g) in cross-section (22A) and viewed from the air bearing surface (22B);

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention.

However, because such elements are well known in the art, and because they do not facilitate a better understanding of the present invention, a discussion of such elements is not provided herein. The detailed description will be provided hereinbelow with reference to the attached drawings.

[First Exemplary Embodiment]

Figure 1A:
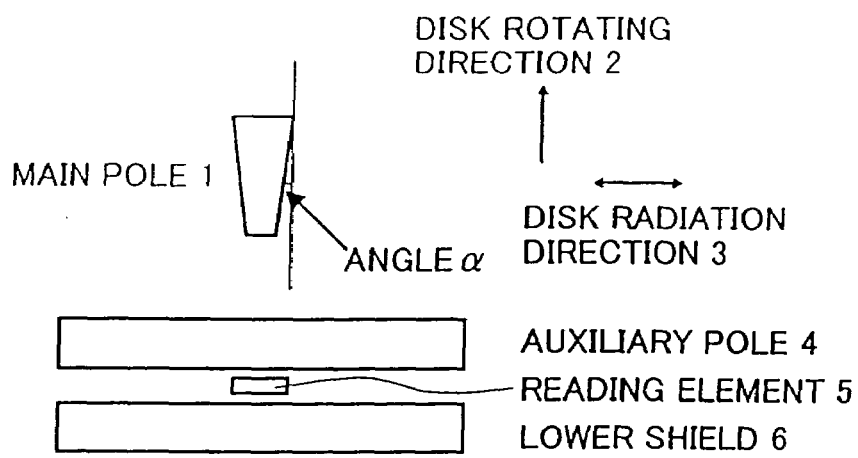
FIG. 1A is a schematic view of the shape of a main pole of an existing single pole type recording head.
Figure 1B:
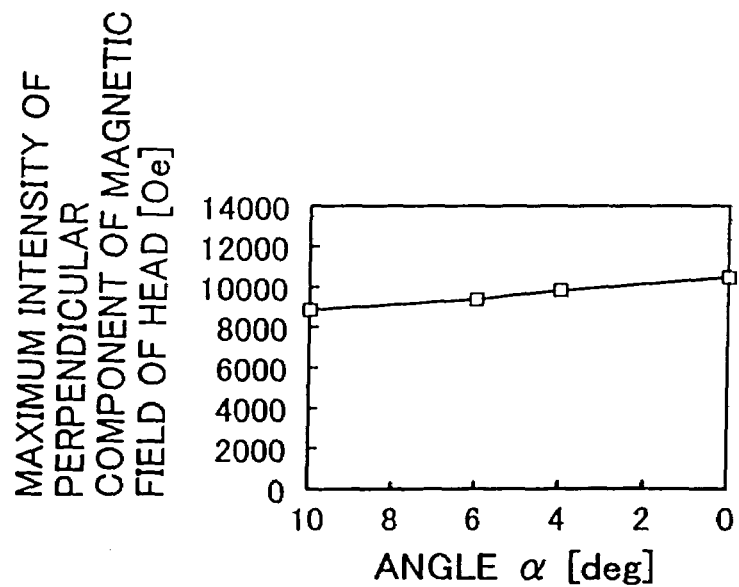
FIG. 1B illustrates the relationship between the shape of the main pole and the perpendicular magnetic field component of the head.
Figure 2:
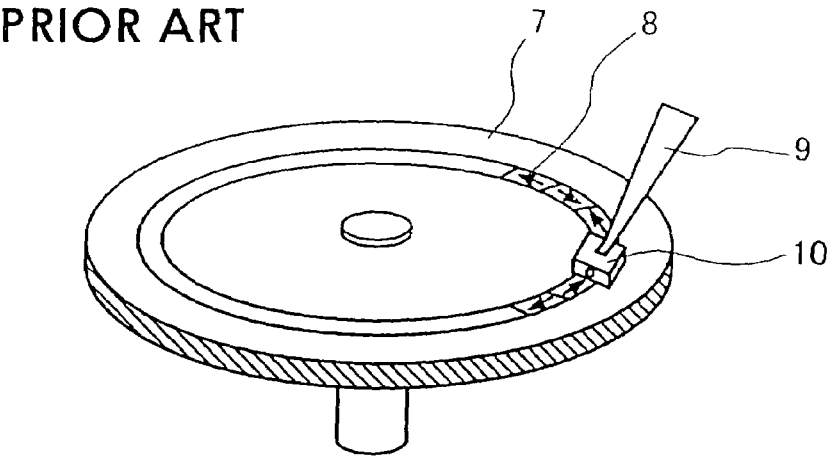
FIG. 2 is a schematic view of a magnetic disk storage apparatus in a preferred embodiment according to the present invention.
Figure 3:
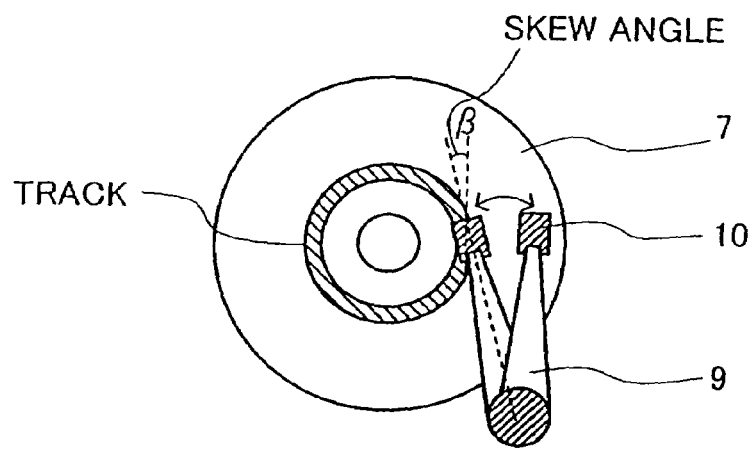
FIG. 3 is a schematic view of a magnetic disk storage apparatus in a preferred embodiment according to the present invention.

FIG. 2 is a schematic view of a magnetic disk storage apparatus according to a preferred embodiment of the present invention illustrating the relationship between a magnetic disk 7 and a magnetic head 10 (FIG. 2 is not to scale). The magnetic disk storage apparatus has a rotating magnetic disk 7 and a magnetic head 10 secured to one end of a support 9. The apparatus reads and writes magnetization signals 8 on the magnetic disk 7. FIG. 3 is a schematic view when the magnetic head 10 is moved on the rotating magnetic disk 7 by swinging a support 9 (not to scale). In this case, a skew angle $\beta$ is formed between the magnetic head 20 supported by support 9 and a tangent drawn to a track on the magnetic disk 7. The skew angle $\beta$ changes as the head is rotated across various tracks (concentric circles on the disk 7) and is typically within a range of about ±30°.

Figure 4:
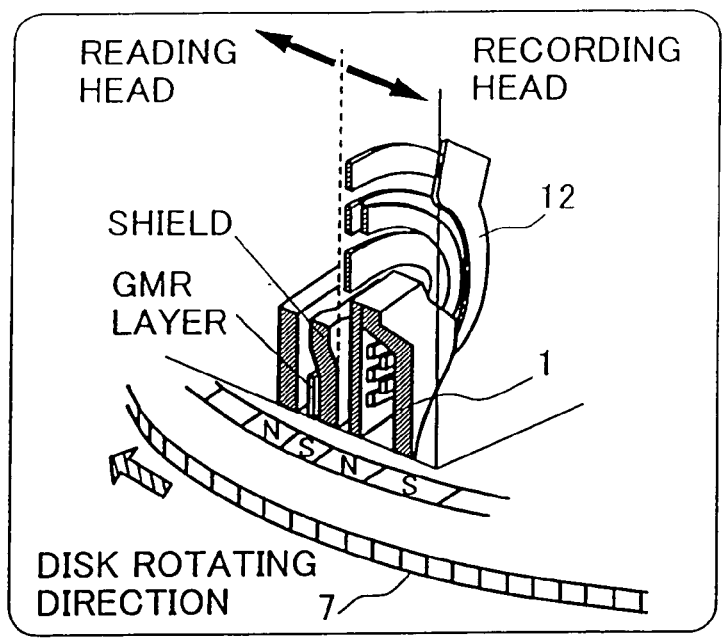
FIG. 4 illustrates the relationship between a magnetic head and a magnetic disk.
Figure 5:
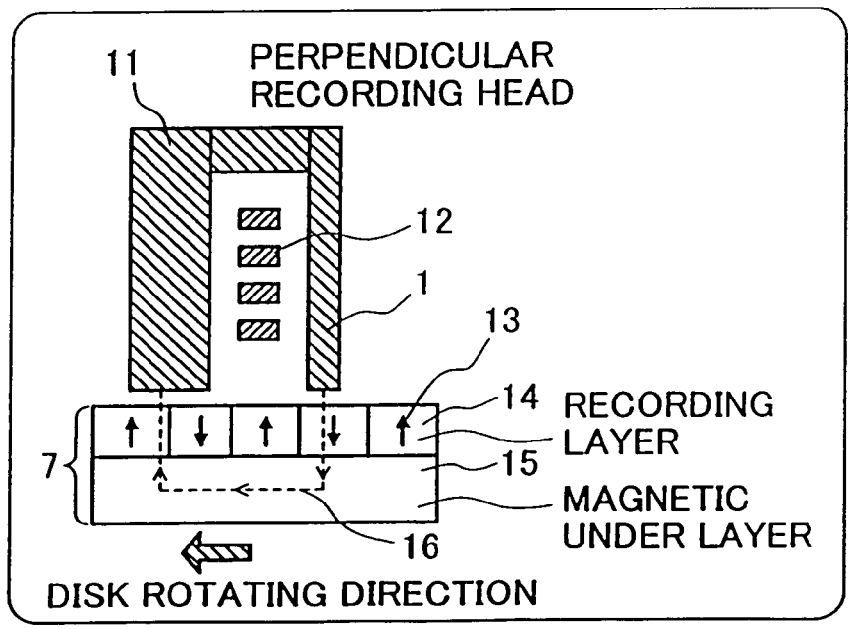
FIG. 5 is a schematic view of a perpendicular recording apparatus according to the present invention.

FIG. 4 is a schematic view showing a magnetic head for perpendicular recording according to a preferred embodiment of the present invention and a magnetic disk (not to scale). Further, FIG. 5 is a schematic view when perpendicular recording is conducted by using the magnetic head and the magnetic disk shown in FIG. 4. A magnetic field 16 emitted from a main pole (second pole) 1 establishes a magnetic circuit passing through a recording layer 14 and a magnetic underlayer 15 as a soft magnetic layer that constitutes the magnetic disk 7. The magnetic field 16 then enters an auxiliary pole (first pole) 11 to record a magnetization pattern 13 in the recording layer 14. The auxiliary pole 11 also serves as an upper shield for the reproducing head.

Figure 6:
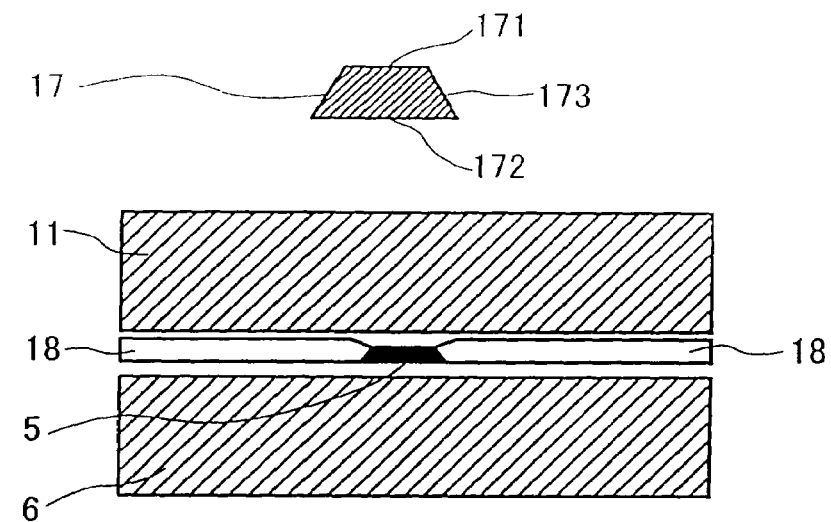
FIG. 6 is a schematic view of a conventional magnetic head for perpendicular recording.

In this case, the shape of a portion of the main pole 1 facing the recording layer 14 of the magnetic disk 7, that is, the air bearing surface and the lateral side of the main pole 1 (the bottom or tip of the main pole 1 in FIGS. 4 and 5), has a significant effect on the shape of the magnetization pattern depending on the disk rotation direction. FIG. 6 is a schematic view of a magnetic head having a main pole shape as disclosed in JP-10-320720/1998.

Figure 8:
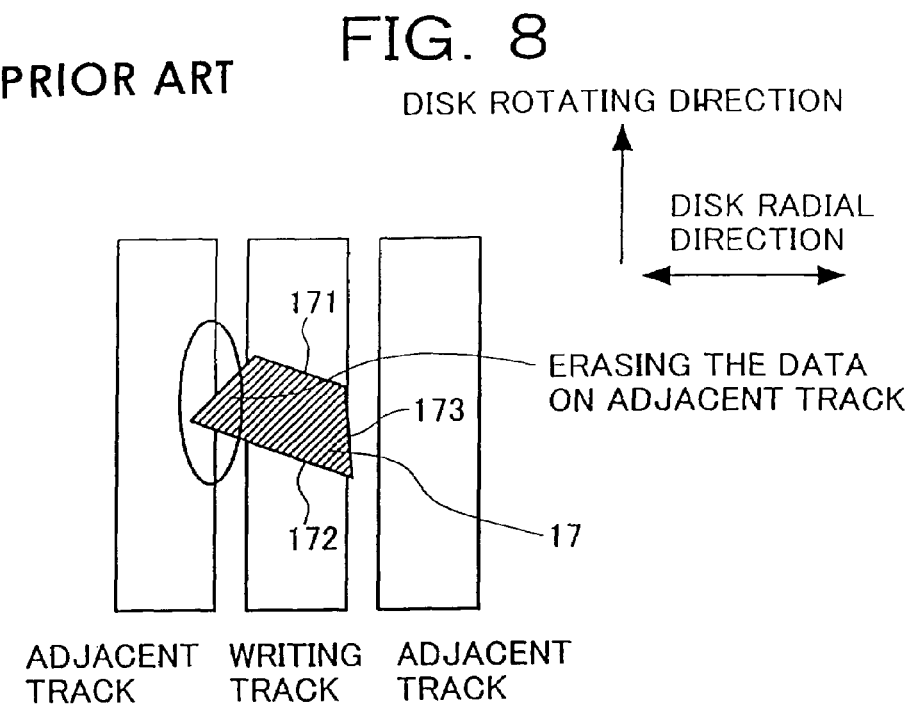
FIG. 8 illustrates the relationship between a main pole of a conventional magnetic head for perpendicular recording and tracks on a disk.

Further, FIG. 8 shows a relation between adjacent tracks and the main pole 17 when a skew angle is formed between the magnetic head shown in FIG. 6 and the disk track. A skew angle is formed in the main pole 17 when the width of a lower surface 172 is larger than the width of an upper surface 171 and an angle formed between the upper surface 171 and the lateral side 173 is an obtuse angle. This configuration results in the lateral side 173 of the main pole 17 writing on the magnetization signals of an adjacent track (circled portion in FIG. 8). Since the width of the lateral side 173 is larger than the width of the upper surface 171 of the main pole 17 that affects writing, the lateral side 173 of the main pole 17 may extend so far on the area of the adjacent track as to conduct writing.

Figure 7:
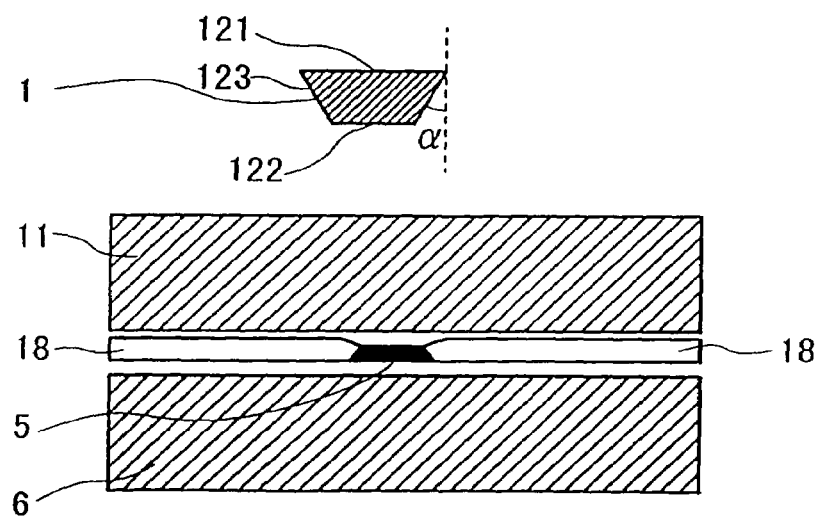
FIG. 7 is a schematic view of a magnetic head for perpendicular recording according to the present invention.
Figure 9:
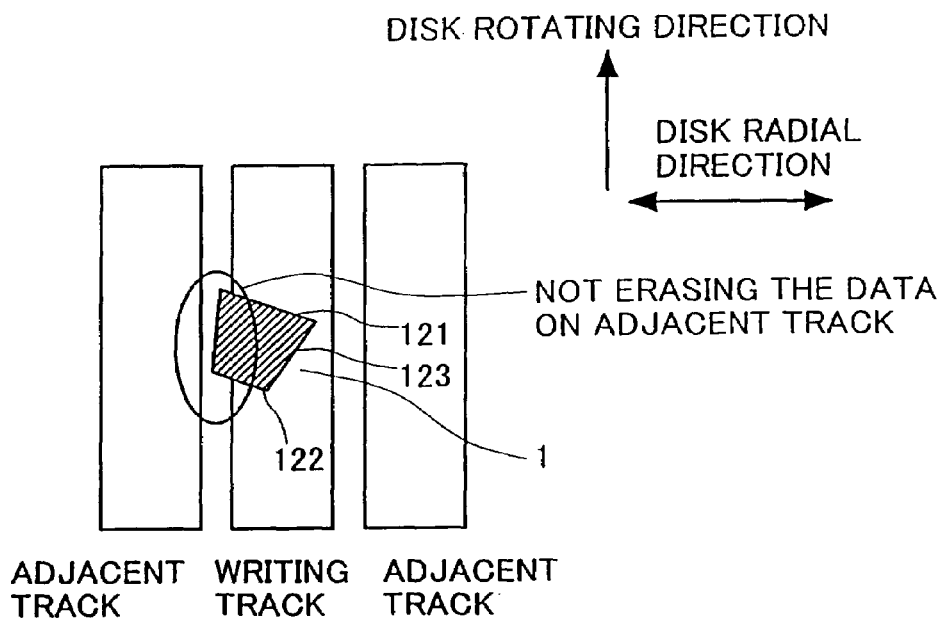
FIG. 9 illustrates the relationship between a main pole of a magnetic head for perpendicular recording according to the present invention and tracks on a disk.

FIG. 7 shows a schematic view of a magnetic head according to the present invention as viewed from the air bearing surface. In the main pole 1, the width is preferably at a maximum at the upper surface 121 of the main pole. Because the upper surface 121 of the main pole is adjusted with the track width of the recording head, the lateral side 123 of the main pole 1 does not extend over the adjacent track as shown in FIG. 9. Accordingly, this constitution may be free from the problem of mistakenly writing magnetization signals on an adjacent track during a writing operation.

As can be seen from FIG. 7 and FIG. 9, the tapered angle for the lateral side 123 of the main pole 1 is preferably determined depending on the skew angle.

Accordingly, the tapered angle for the lateral side 123 of the main pole 1 is set depending on the constitution of the magnetic disk storage apparatus and an angle $\alpha$ relative to a normal line direction for the upper surface 121 of the main pole 1 may be set within a range of approximately 0° to 30° (based on the skew angle described above). That is, the angle formed between the upper surface 121 and the lateral side 123 may be set within a range of approximately 60° to 90°.

Figure 10:
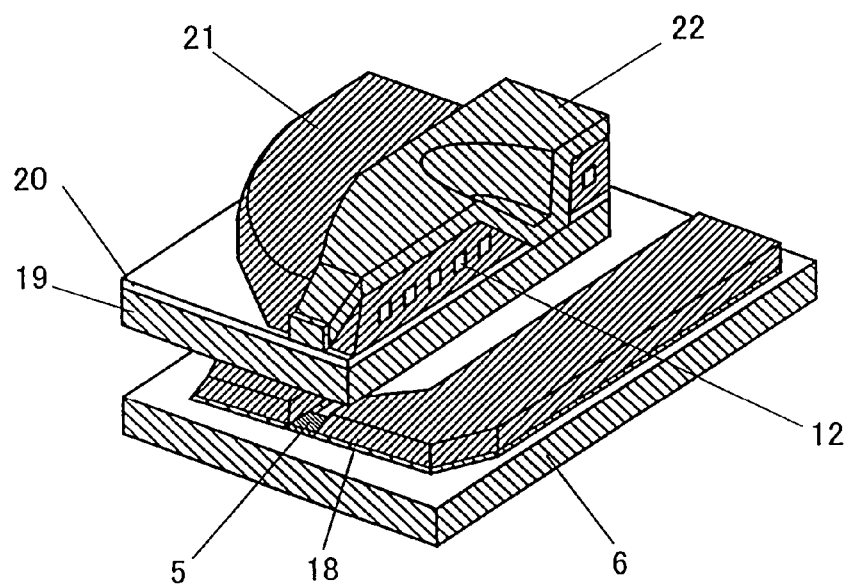
FIG. 10 is a schematic view of a conventional magnetic head.
Figure 11:
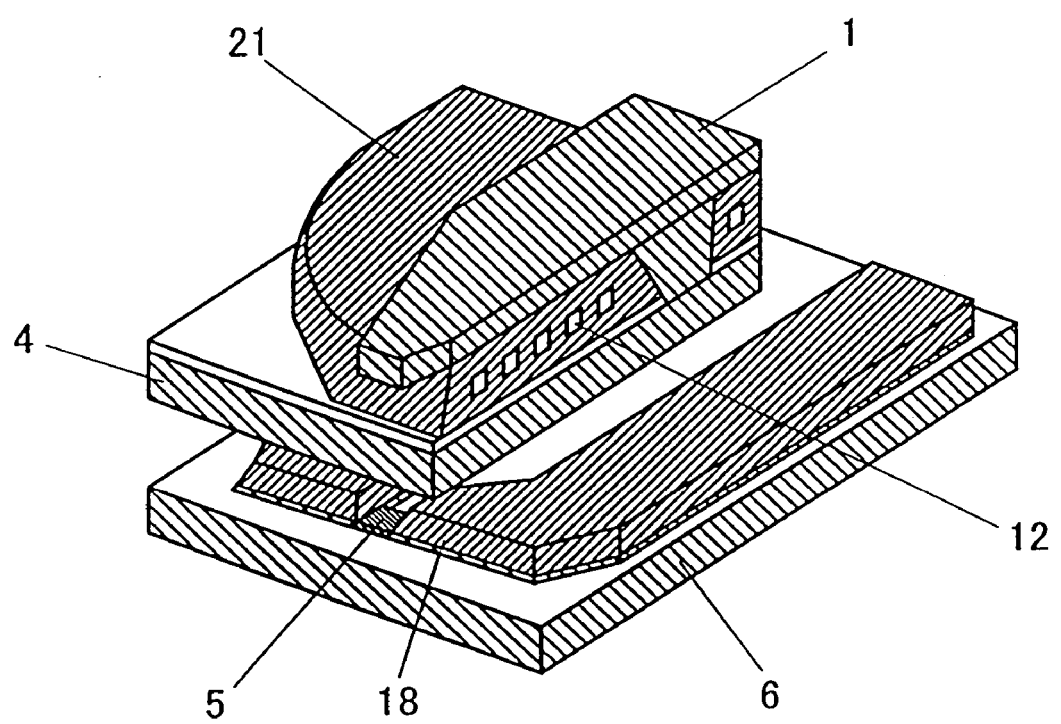
FIG. 11 is a schematic view of a magnetic head for perpendicular recording according to the present invention.

FIG. 10 outlines a reading/writing separation type recording head. It has a structure in which a writing head is stacked on a reading head using a magnetoresistive layer 5. FIG. 11 is a schematic view of a reading/writing separation type recording head for perpendicular recording in which the writing head and the reading head of the present invention are integrated.

One difference between these drawings is that the existing magnetic head includes a thin gap layer 20 (for example, 0.2 $\mu$m) present at the medium opposed surface (air bearing surface) between the upper magnetic core 22 and an upper shield of a writing head that also serves as a lower magnetic core 19 in the existing head. In the present invention (FIG. 11), on the other hand, there is preferably a large space (for example 3 to 5 $\mu$m) between the main pole 1 and the auxiliary pole 4.

[Second Exemplary Embodiment]

FIG. 12 is a schematic view for a presently preferred manufacturing method according to this invention (not to scale). FIG. 12A shows a step of forming a resist pattern 24 on an inorganic insulating layer 23. $Al_2O_3$ may be preferred for the inorganic insulating layer, but SiC, AlN, $Ta_2O_5$, TiC, $TiO_2$, $SiO_2$ and other materials may also be used. The resist pattern 24 is exposed using a KrF excimer laser stepper. As the resist 24, a positive resist such as TDUR-P201 manufactured by Tokyo Ohka Kogyo Co., Ltd. may be used. When a resist of 0.7 $\mu$m thickness is formed, a 0.2 $\mu$m size can be resolved.

FIG. 12B shows a step of etching the inorganic insulating layer 23 by using the resist 24 as a mask. When $Al_2O_3$ is used for the resist 24, $BCl_3$ or a gas mixture of $BCl_3$ and $Cl_2$ may be used as an etching gas. In addition, when AlN is used, the chlorine type gas described above is preferred for etching. In a case where easily etchable $Ta_2O_5$, TiC, $TiO_2$, $SiO_2$, SiC and similar materials are used, fluorine gas such as $CHF_3$, $CF_4$, $SF_6$, $C_4F_8$ and similar etching gases can be used. The etching depth is preferably set to approximately 0.4 $\mu$m. The tapered angle in this exemplary case for the inorganic insulating layer 23 is 10°.

FIG. 12C shows a step of removing the resist 24 after the etching. FIG. 12D shows a step of forming a stopper layer 25 over the inorganic insulation layer 23. When CMP is adopted for flattening in the subsequent step, a stopper layer for CMP is formed, and an etching stopper is formed in a case where the flattening process includes etching. In a case where the controllability for the layer thickness is satisfactory in the flattening step, the step of forming the stopper layer may be omitted.

As the stopper layer for CMP, a single layer comprising C, Ta, Mo, Nb, W, Cr or similar material or an alloyed laminate layer can be used. In one exemplary embodiment, sputtered C was used. Since C is chemically stable, it is not polished chemically and, when it is mechanically polished, a polishing liquid waste is tinted black. Therefore, the end point of polishing is easily detected to improve the controllability for the layer thickness of the main pole. As the etching stopper layer 25, noble metals not undergoing reactive etching may be used and a single layer comprising Au, Pt, Pd, Ru, Rh, Cu, Ag, Te, Re, Os, Ir or similar materials or a laminate or an alloy layer is preferred. In addition, Cr, Ni and others may also be used since they undergo no reactive etching. All of these layers may be formed by a sputtering method.

Thereafter, FIG. 12E shows a step of forming a magnetic layer 26. The layer 26 may be formed either by a plating method or a sputtering method. In the case of electrolytic plating, it may be necessary to apply plating after forming a plated underlayer. In a case of the sputtering method, since the groove formed in the steps of FIGS. 12B and 12C has a large aspect ratio, it is necessary to use a method having favorable directionality, for example, a long throw sputtering or collimation sputtering method, so as not to form voids in the magnetic layer. In a case of using the electrolytic plating method, $Fe_{55}Ni_{45}$ having a saturation magnetic flux density of 1.6 T or CoNiFe having a saturation magnetic flux density of 1.9 T may be used. For the plated underlayer, a magnetic layer of the same composition as that of the plated layer or a non-magnetic layer may be used.

FIG. 12F shows a step of flattening the upper surface of the magnetic layer 26 to form a main pole 1. For flattening, when a polishing method such as CMP is used, the layer thickness can be controlled by stopping the polishing by the stopper layer 25, and the upper surface could be flattened completely. Flattening for less than 1 nm may be possible for the entire groove as the track width. In an exemplary case, 0.2 μm of the track width identical with that of the resist pattern in the step of FIG. 12A is obtained, and the tapered angle for the lateral side of the main pole was 10° (formed in the step of FIG. 12B.

Further, in a case of using etching for the flattening step, the flattening can be conducted by coating a resist a single time and then conducting etching using a chlorine type gas, for example, $BCl_3$ or a gas mixture of $BCl_3$ and $Cl_2$ (so-called etching back). In this case, a stopper layer 25 made of noble metals or a stopper layer made of Ni, Cr or similar materials described above may be effective.

When the magnetic head for perpendicular recording according to this exemplary embodiment is mounted, a magnetic disk storage apparatus having an area recording density of at least 70 Gbit/in² may be manufactured.

[Third Exemplary Embodiment]

Figure 13:
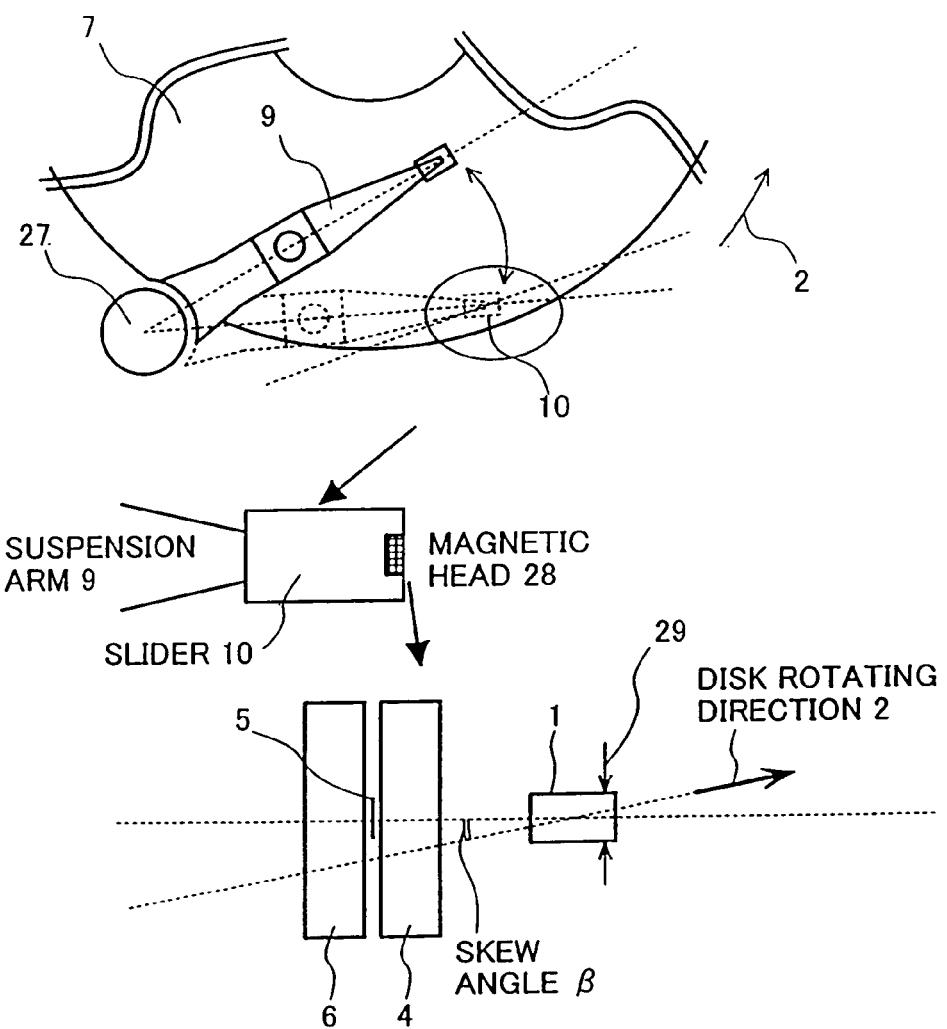
FIG. 13 is a conceptual view detailing the occurrence of the skew angle in top (upper figure) and side (lower figure) views.

FIG. 13 is an alternate schematic view of a medium-head system for a magnetic disk apparatus according to a preferred embodiment of the present invention (not to scale). As briefly described above, the magnetic disk storage apparatus writes and reads magnetization signals on a magnetic disk 7 using a magnetic head 28 attached to a slider 10 fixed to one end of a suspension arm 9. The magnetic head 28 moves in the radial direction of the disk 7 (seeking operation) by the swinging operation of the suspension arm 9. Also as described above, a skew angle β (of approximately ±30°) is set as shown in FIG. 13.

Figure 14:
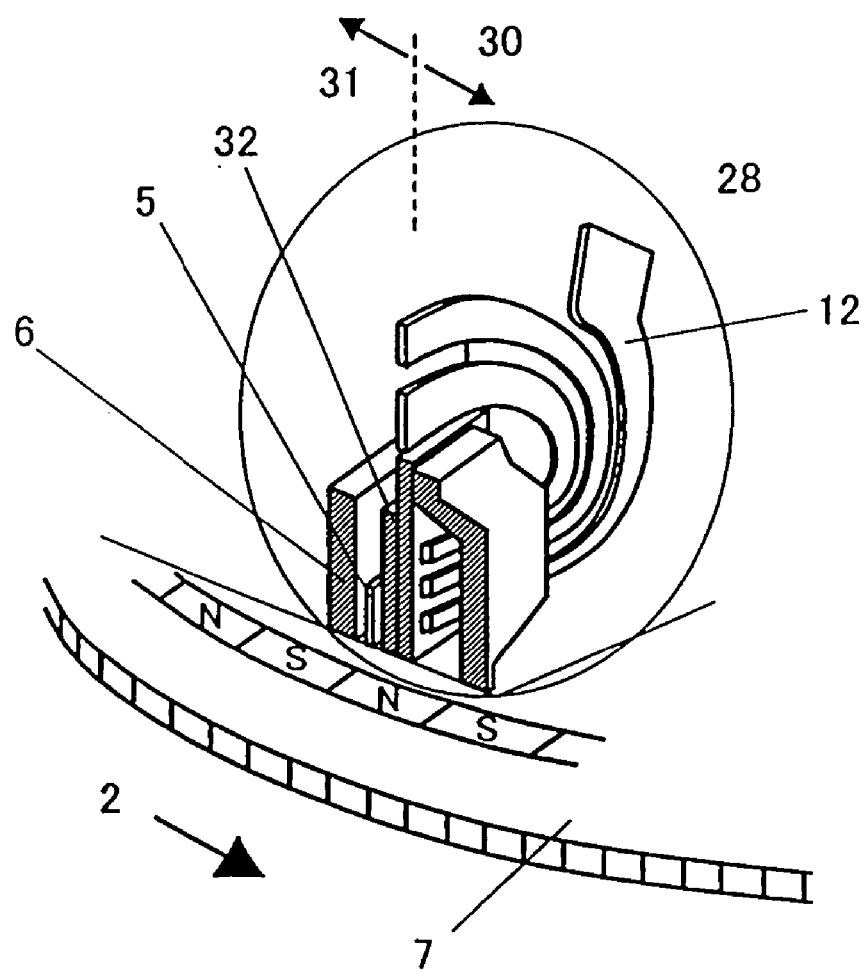
FIG. 14 is a schematic view showing the relationship between the magnetic head for perpendicular recording according to this invention and a magnetic disk.

FIG. 14 is a schematic view for the relation between the writing/reading head for perpendicular recording and a magnetic disk 7. The perpendicular writing/reading head comprises a writing head part 30 and a reading head part 31. The writing head is a single pole type recording head and the reading head has a structure in which a reading device is disposed between first and second soft magnetic shield layers. For the reading device, a giant magnetoresistive device (GMR element), tunnel magnetoresistive device (TMR element) and other elements are used because they are highly sensitive.

Figure 15:
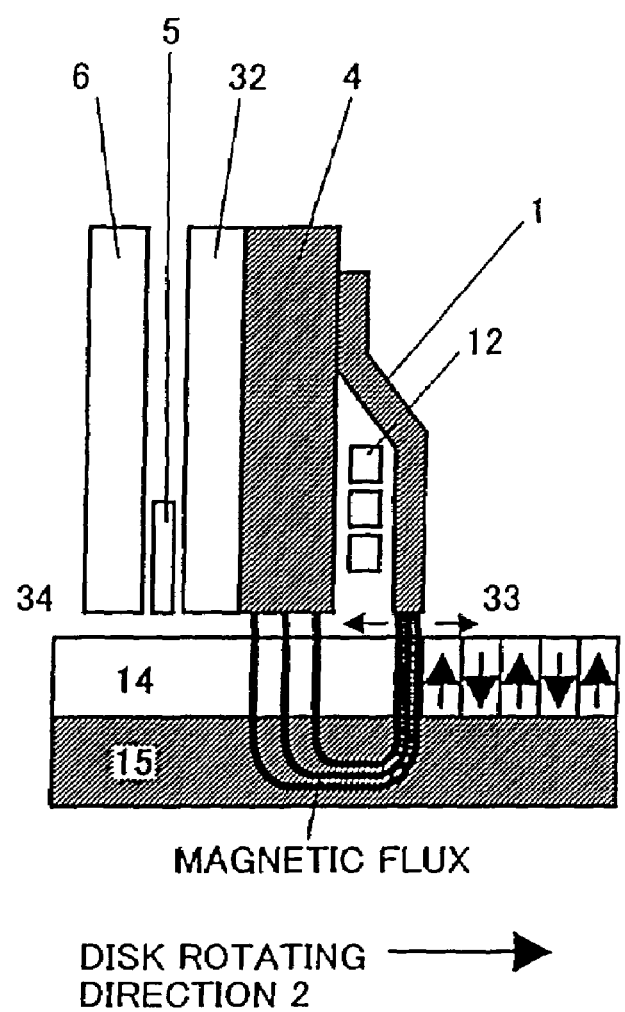
FIG. 15 is a schematic view showing the concept of perpendicular recording.

FIG. 15 shows a schematic view of a perpendicular writing/reading head. The magnetic field emitted from the main pole 1 of the single pole type recording head establishes a magnetic circuit passing through the recording layer 14 and the magnetic underlayer 15, and entering the auxiliary magnetic pole 4 to record the magnetization pattern in the recording layer 14.

Figure 16A:
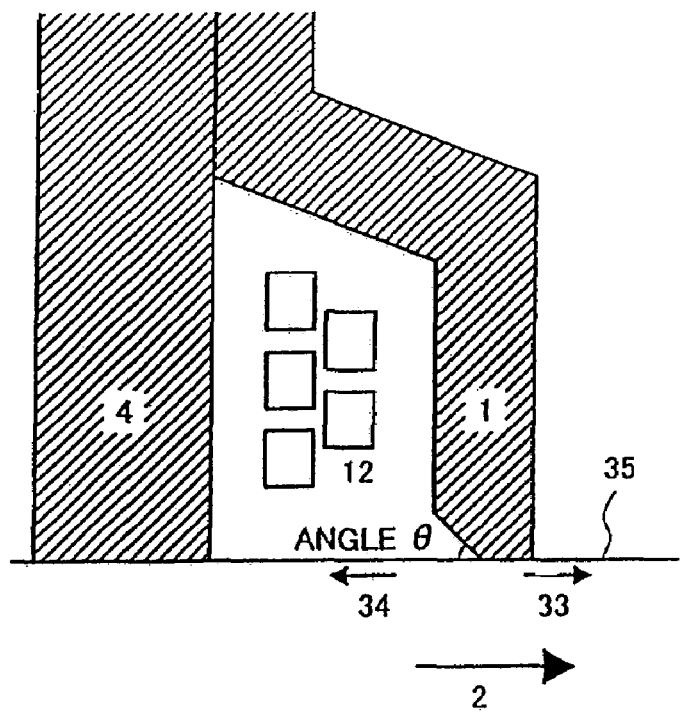
FIG. 16 is a schematic view showing the shape of a main pole of a single pole type recording head according to this invention in cross-section (16A) and schematic (16B) views.
Figure 16B:
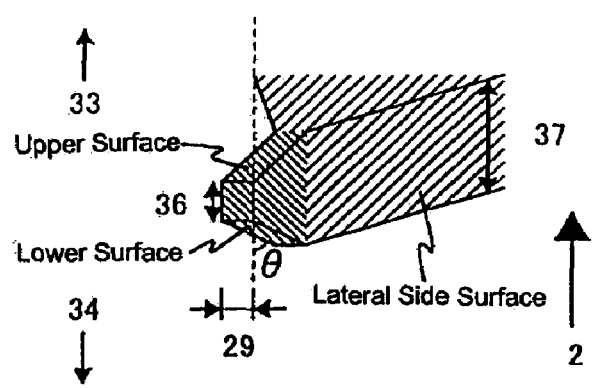

FIG. 16A shows a cross sectional view against the air bearing surface of the shape of the main pole 1 of the magnetic head according to this invention. FIG. 16B shows a schematic view for the main pole of the magnetic head as viewed from the air bearing surface. The main pole 1 on the leading side 34 situated to the upstream in the disk rotational direction 2 is cut at the corner on the side of the air bearing surface of the main pole 1 to form an inclined shape (angle θ).

Figure 17:
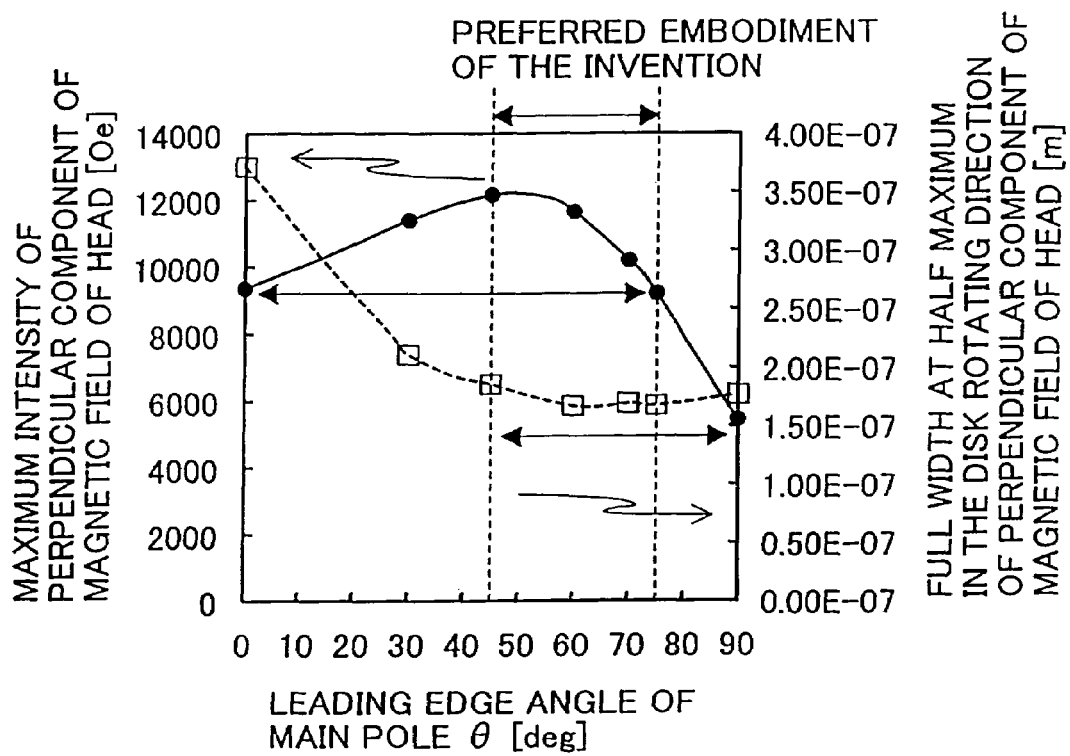
FIG. 17 illustrates the relationship between the magnetic field intensity of a head and a top end angle of the single pole type recording head and between the width of a magnetic field in the rotational direction of a disk and the angle at the top end angle.

FIG. 17 shows the relationship between the upper end angle θ (leading edge angle) and the maximum magnetic field intensity, and a relation between the half-value width in the disk rotational direction of the recording magnetic field distribution emitted from the main pole and the top end angle θ. While the magnetic field intensity increases up to about θ=45° and then decreases subsequently, a larger magnetic field intensity is obtained within a range of the top end angle θ from 0° to about 75° compared with a state where the top end of the main pole is not angled. Because this tends to concentrate on the magnetic fluxes on the pole tip at the air bearing surface, this is considered to be attributable to the decrease in the amount of the magnetic fluxes flowing from the leading side (edge) of the main pole to the magnetic medium.

Further, in view of the relationship between the half-value width of the recording magnetic field distribution in the disk rotational direction generated from the main magnetic portion in FIG. 17 and the top end angle θ, it can be seen that the half-value width of the magnetic field in the disk rotational direction is decreased, (i.e., the recording magnetic field is further converged). This is considered to occur because the layer thickness 36 of the main pole 1 exposed to the air bearing surface is decreased by the provision of the tapered surface (based on θ). The half-value width decreases steeply up to about 45° of the top end angle θ and does not change significantly thereafter. As described above, for obtaining the converging effect for the recording magnetic field, it is effective to control the top end angle θ within a range of between approximately 45° and 75°.

Figure 18:
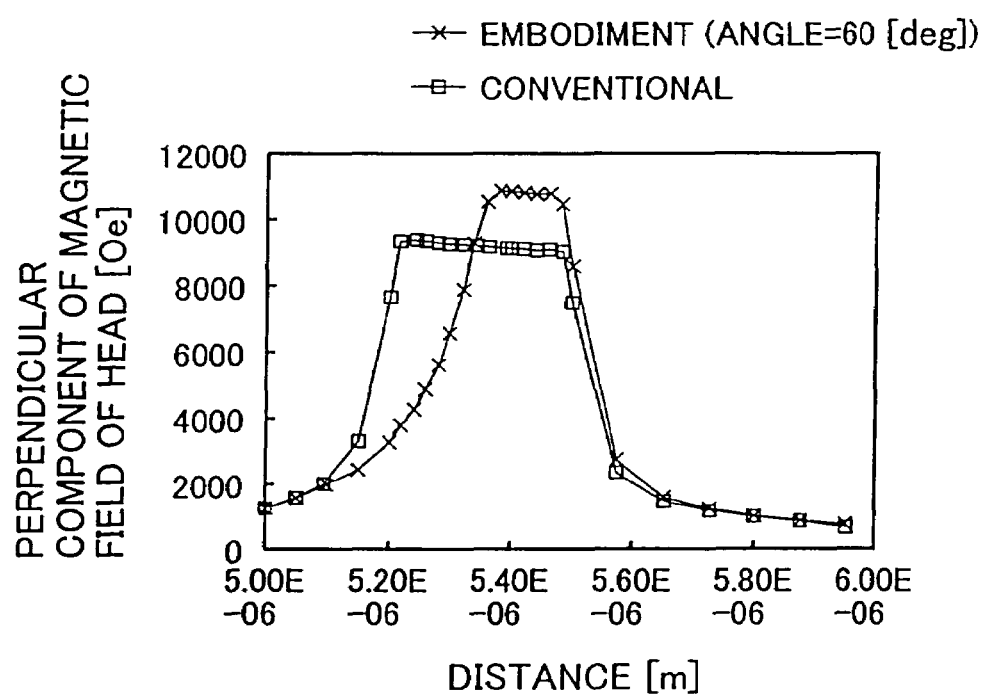
FIG. 18 shows a distribution of a magnetic field intensity in the running direction of the disk of a single pole type recording head according to this invention.

FIG. 18 shows a recording magnetic flux distribution in the disk rotational direction 2 of the single pole type recording head according to the present invention and a conventional single pole type recording head where the top end angle θ is 0°. Compared with the conventional device, FIG. 18 shows that the single pole type recording head according to this invention has a greater maximum magnetic field intensity and a narrower width of the recording magnetic field. In this case, the magnetic field gradient on the trailing side 33 that greatly effects the recording bit is not deteriorated. Accordingly, even when the skew angle is set, the recording width is not increased and erasure of data on adjacent tracks can be substantially prevented.

[Fourth Exemplary Embodiment]

Figure 19A:
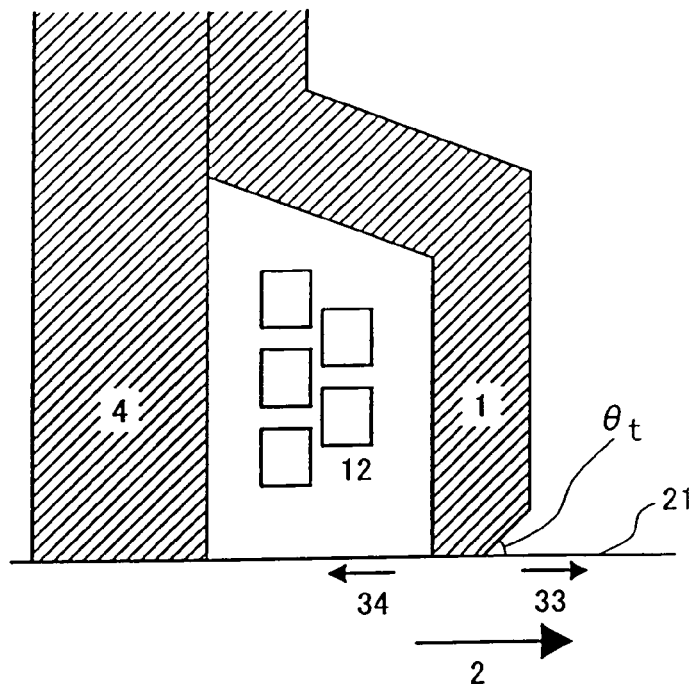
FIG. 19 is a schematic view showing the shape of a main pole of a single pole type recording head according to this invention including tapered trailing edge (19A) and tapered leading and trailing edges (19B)

While the tapered surface is provided on the leading side 34 of the top end of the main pole 1 in the third exemplary embodiment, the tapered surface may also be disposed on the trailing side 33 of the main pole 1. FIG. 19A shows the shape of the single pole type recording head where the corner at the air bearing surface of the main pole 1 on the trailing side 33 situated downstream in the rotational direction 2 of the disk is cut into an inclined shape $\theta_t$. Also in this case, the width of the magnetic field in the disk rotational direction 2 can be narrowed without decreasing the magnetic field intensity, and the degree of increase of the recording width exceeding the geometrical track width can be suppressed. A magnetic head for perpendicular recording without erasing data on adjacent tracks even though the existence of the skew angle may be provided according to this presently preferred exemplary embodiment.

[Fifth Exemplary Embodiment]

Figure 19B:
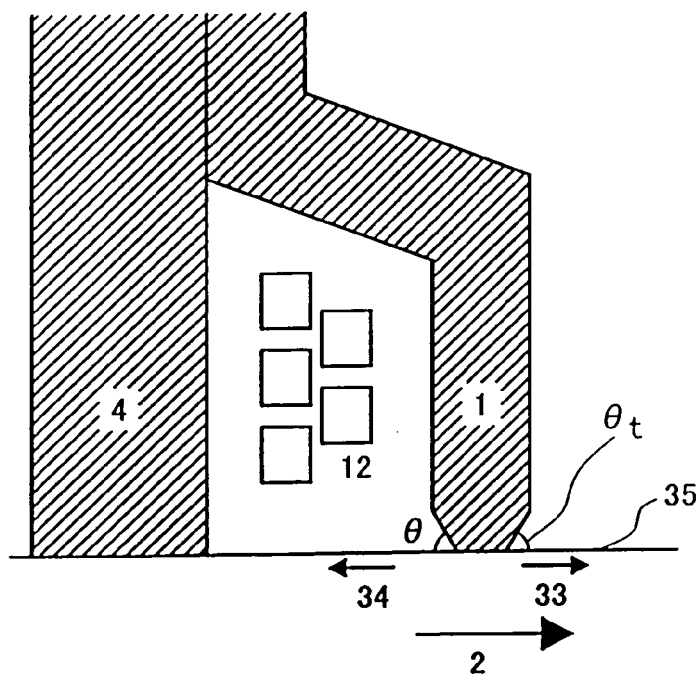

In this embodiment, as shown in FIG. 19B, tapered surfaces are disposed on both of the leading side $\theta$ 34 and the trailing side $\theta_t$ 33 at the top end of the main pole 1. The width of the magnetic field in the disk rotational direction 2 can be narrowed without decreasing the magnetic field intensity even when the corner at the air bearing surface of the main pole is cut into an inclined shape. Further, the degree of increase of the recording width exceeding the geometrical track width can be suppressed, and a magnetic head for perpendicular recording without erasing data on adjacent tracks even when the skew angle is set is preferably provided.

[Sixth Exemplary Embodiment]

The sixth exemplary embodiment of the present invention preferably includes a case where the tapered surface formed at the top end of the main pole is a curved surface. While the tapered surface may be formed as a curved surface (not a planer or linear surface) depending on the manufacturing process, an identical effect can be obtained for the curved tapered surface as in the planar tapered surface.

Figure 20:
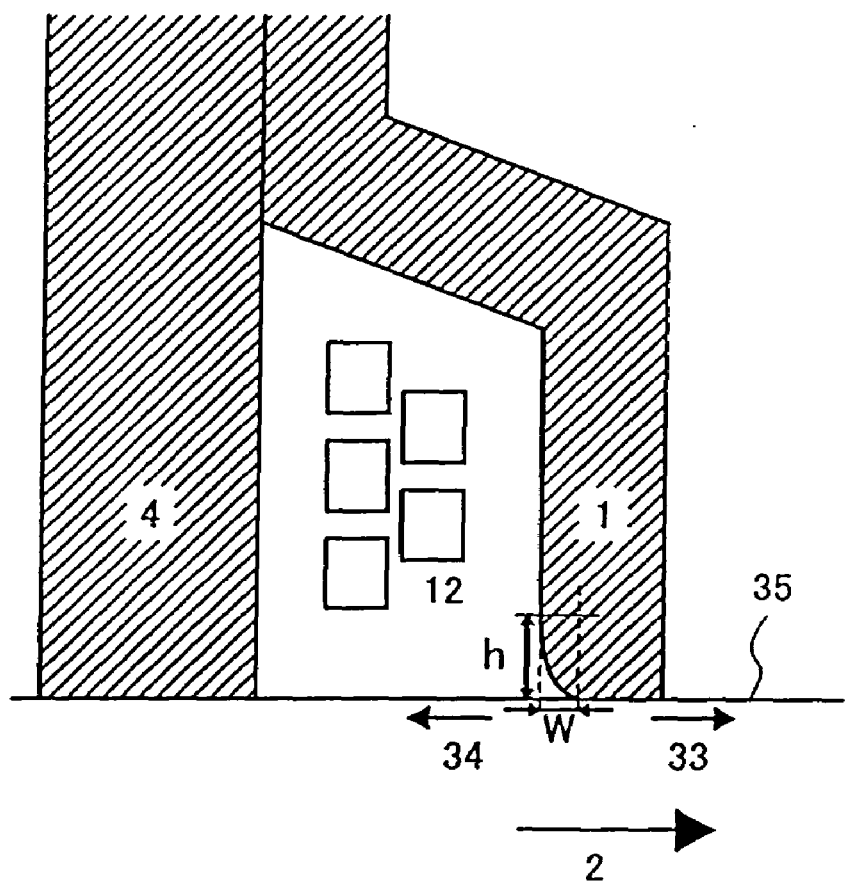
FIG. 20 is a schematic view showing the shape of a main pole of a single pole type recording head according to this invention.

FIG. 20 is a cross sectional view in which the single pole type recording head is viewed from the direction of the width of track. The tapered surface disposed at the top end of the main pole 1 in this case is a curved surface. In FIG. 20, the length indicated by h is a projected length of the curved line formed by the curved tapered surface relative to the direction of the flying height and the length indicated by W is a projected length of the curved line formed by the curved tapered surface relative to the air bearing surface (when the top end of the main pole is viewed from the track direction as in FIG. 20).

Also in this case, as long as the angle $\theta$ defined as arc tangent for h/W, that is, $\theta=\mathrm{ArcTan}(h/W)$, is within a range between approximately 45° and 75°, the same effect can be obtained as in a state where the top end angle $\theta$ is defined within a range between 45° and 75°.

[Seventh Exemplary Embodiment]

FIG. 21 and FIG. 22 show charts of a method for manufacturing a single pole type recording head shown in the third exemplary embodiment. FIGS. 21A and 22A show cross sectional views of the process, and FIGS. 21B and 22B show views from the air bearing surface. To aid in understanding, the scale enlargement ratio for each portion in the drawing is not uniform.

Step (a) in FIG. 21 shows a state where a resist pattern 38 is formed on an inorganic insulating layer 39. A reading head part and an auxiliary pole layer 4 are formed below the inorganic insulating layer 39. For the inorganic insulating layer, SiC, AlN, $Ta_2O_5$, TiC, $TiO_2$ or $SiO_2$ may be used in addition to $Al_2O_3$ or other materials.

Step (b) in FIG. 21 shows a state where the inorganic insulating layer 39 is etched using the resist pattern 38 as a mask. For the sake of convenience, the reading head portion and the auxiliary pole layer are omitted in the step (b) portion of FIG. 21 as well as in the subsequent drawings. Since the portion at the resist end is hidden by the resist, it is etched less and the slope as shown in FIG. 21 is formed. As an etching gas, $BCl_3$ or a gas mixture of $BCl_3$ and $Cl_2$ may be suitable when $Al_2O_3$ or AlN is used as the insulating layer 39. In a case where SiC, AlN, $Ta_2O_5$, TiC, $TiO_2$ and $SiO_2$ is used as the insulating layer 39, fluoric gas such as $CHF_3$, $CF_4$, $SF_6$ or $C_4F_8$ can be used since the material is easily etched.

Step (c) in FIG. 21 depicts a state where the resist is removed after etching. Step (d) shows a state where a resist pattern 38 is formed. Step (e) of FIG. 22 shows a state where a magnetic layer 40 is plated. $Fe_{55}Ni_{45}$, CoNiFe and similar materials can be used as the material for the magnetic layer 40 since they have high saturation magnetic flux density and favorable soft magnetic characteristic. For the plated underlayer, either a magnetic layer of an identical composition with that of the plated layer or a non-magnetic layer may be used.

Step (f) in FIG. 22 shows a state where the resist 38 is removed. Step (g) shows a state where the air bearing surface 35 of the magnetic layer 40 is flattened by polishing to form a main pole. A polishing method such as chemical mechanical polishing (CMP) may be used for the flattening step. In the step for forming the air bearing surface, the air bearing surface 35 may be formed at a position shown by the dotted line. The single pole type recording head for perpendicular recording according to this invention in which the tapered surfaces is formed on the leading side may be manufactured by the manufacturing method described above.

[Eighth Exemplary Embodiment]

Figures 23A, 23B:
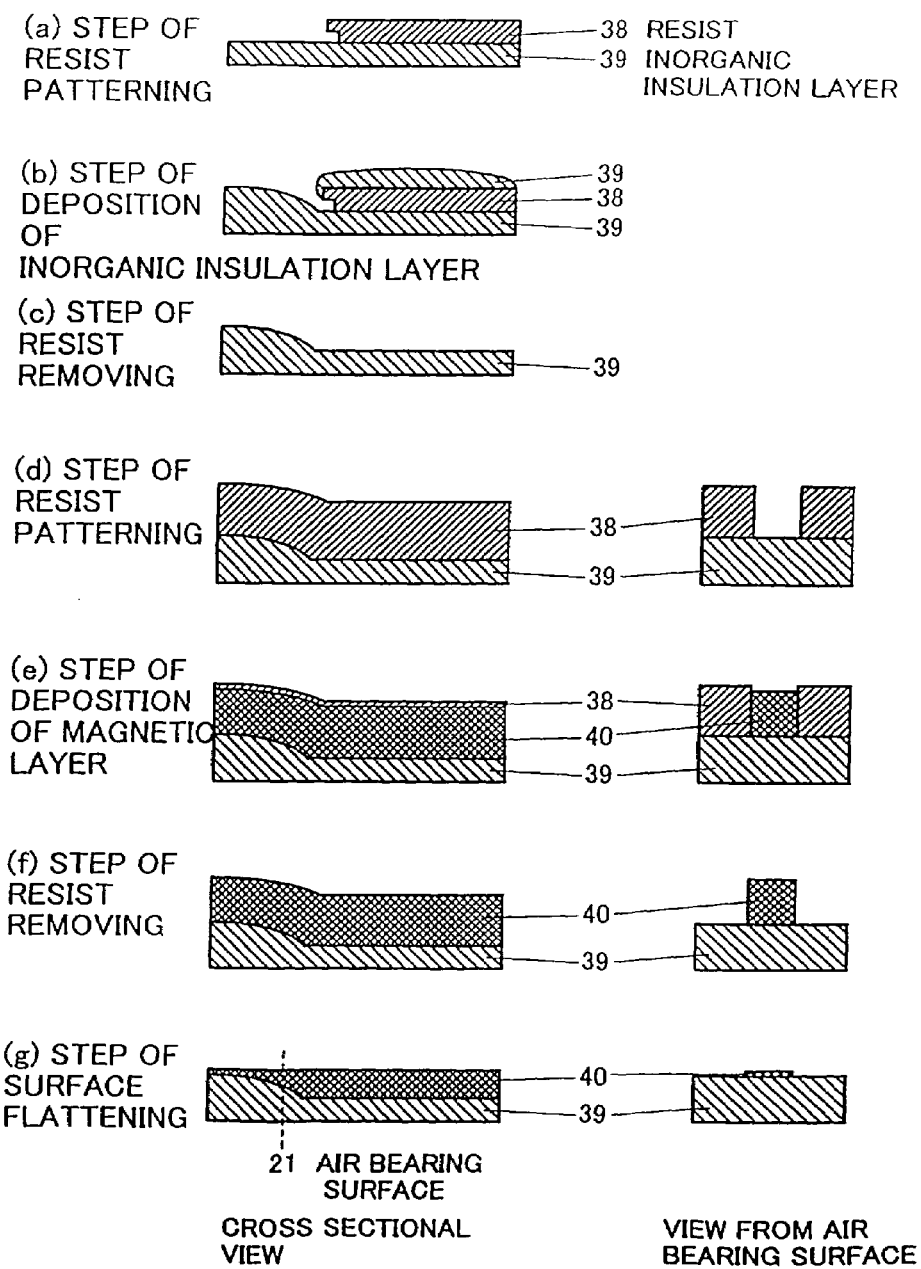
FIG. 23 is a schematic view of a process for forming a main pole of a single pole type recording head in process steps (a)–(g) in cross-section (23A) and viewed from the air bearing surface (23B)

The FIG. 23 chart depicts another manufacturing method of a single pole type recording head according to this invention utilizing the lift-off system. Again, FIG. 23A shows a cross sectional view, and FIG. 23B shows a view from the air bearing surface. In the same manner as in FIGS. 21–22, while the reading head portion and the auxiliary pole layer are formed below the inorganic insulating layer 39, they are omitted for the sake of convenience.

At first, a resist pattern 38 of a shape as shown in FIG. 23 is formed on an inorganic insulating layer 39. While soft magnetic layers for a reading head and an auxiliary pole are formed below the inorganic insulating layer 39, they are omitted in the drawing. Step (a) in FIG. 23 shows a state where the resist pattern 38 is formed. Then, for forming the slope, sputtering is applied on the resist pattern 38 of the inorganic insulating layer 39. Step (b) shows a state where sputtering is applied. The angle of the slope can be controlled by adjusting the target-to-substrate distance upon sputtering, the gas pressure upon sputtering, the angle of the substrate relative to the target, and other characteristics of the sputtering method.

After sputtering, the resist 38 and the inorganic insulating layer 39 deposited thereto are removed. Step (c) in FIG. 23 shows a state where the resist is removed. Step (d) shows a state where another resist pattern 38 is formed. Step (e) shows a state where a magnetic layer 40 is plated. Step (f) shows a state where the resist 38 is removed, and step (g) shows a state where the upper surface of the magnetic layer 40 is flattened to form a main pole. In the step of forming the air bearing surface, the air bearing surface 21 may be situated at a position shown by a dotted line in the drawing. A magnetic head for perpendicular recording having a slope on the leading side may be produced by the manufacturing method described above.

[Ninth Exemplary Embodiment]

Figure 24:
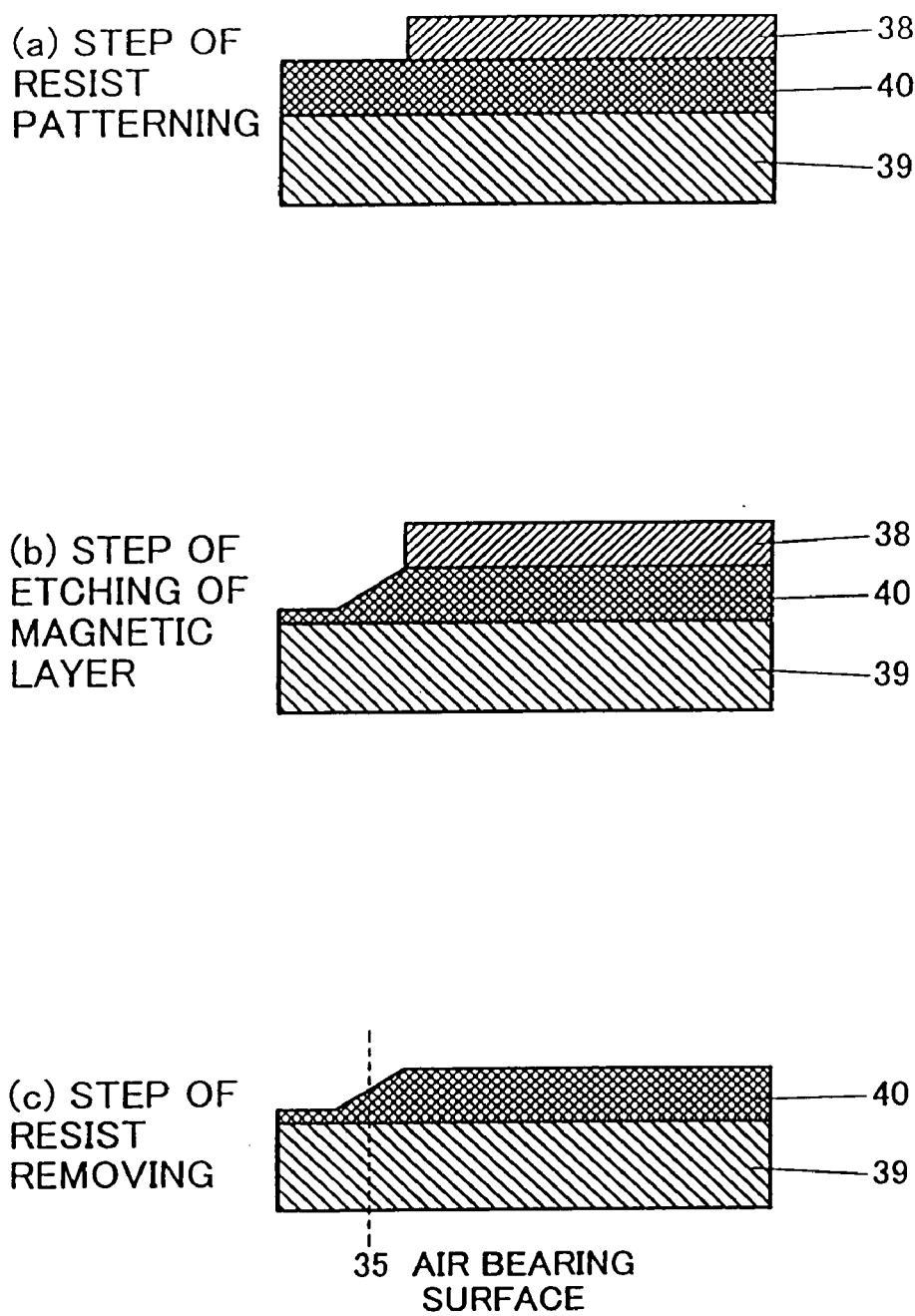
FIG. 24 is a schematic view of a process for forming a main pole of a single pole type recording head in process steps (a)–(c) in cross-section (24A) and viewed from the air bearing surface (24B).

FIG. 24 is a step chart for an additional method of manufacturing a single pole type recording head according to this invention. FIG. 24(a) shows a state where a resist pattern 38 of the shape shown in the drawing is formed on an inorganic insulating layer 39 and a magnetic layer 40 laminated in this order as the main pole. FIG. 24(b) shows a state where the magnetic layer 40 is etched by using the resist pattern 38 as a mask. FIG. 24(c) shows a state where a resist 38 is removed after etching. In the step of forming an air bearing surface, the air bearing surface 35 may be situated at a position shown by a dotted line in FIG. 24(c). A magnetic head for perpendicular recording according to this invention having a slope on the trailing side can be manufactured by the manufacturing method described above.

It is possible to provide a magnetic head for perpendicular recording capable of suppressing the degree of increase in the recording width to less than the geometrical track width without decreasing the maximum recording magnetic field intensity. Further, magnetic heads according to the present invention preferably do not erase data on adjacent tracks even when the skew angle is set by shaping the main pole such that the tapered surface is provided to the top end on the leading side or the trailing side. This head may mounting to form a magnetic storage apparatus.

The foregoing invention has been described in terms of preferred Embodiments. However, those skilled, in the art will recognize that many variations of such Embodiments exist. Such variations are intended to be within the scope of the present invention and the appended claims.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A single pole type recording head for recording on a perpendicular magnetic recording medium having a soft magnetic underlayer comprising:
a main pole including an upper, lower, and two lateral side surfaces, and further including an air bearing surface which is generally perpendicular to said upper, lower and two lateral side surfaces, said lower surface and upper surface defining a leading side and a trailing side of the main pole, respectively; and
an auxiliary pole, wherein said two side surfaces of the main pole are tapered in the direction of the flying height as viewed from the air bearing surface, and further wherein said main pole is tapered on the leading side in the direction of the flying height as viewed from the air bearing surface.

2. A single pole type recording head according to claim 1, wherein a magnetic circuit is established from the main pole through the magnetic underlayer and into the auxiliary magnetic pole.

3. A single pole type recording head according to claim 1, wherein the taper of said two side surfaces occurs in two stages, wherein in an upper taper portion (away from said air bearing surface), the two side surfaces are tapered a first amount, and in a lower taper portion (between said upper taper portion and said air bearing surface, the two side surfaces are tapered substantially more than said first amount.

4. A writing/reading head comprising:
a reading head; and
a single pole type writing head for recording on a perpendicular magnetic recording medium having a soft magnetic underlayer comprising
a main pole including an upper, lower, and two lateral side surfaces, and further including an air bearing surface which is generally perpendicular to said upper, lower and two lateral side surfaces, said lower surface and upper surface defining a leading side and a trailing side of the main pole, respectively, and
an auxiliary pole, wherein said two side surfaces of the main pole are tapered in the direction of the flying height as viewed from the air bearing surface, and further wherein said main pole has a tapered surface on the-leading side in the direction of the flying height as viewed from an air bearing surface, further wherein the tapered surface intersects the air bearing surface.

5. A writing/reading head according to claim 4, wherein the angle formed between the air bearing surface of the main pole and the tapered surface is no more than 75°.

6. A writing/reading head according to claim 5, wherein said angle is in the range of 45° to 75°.

7. A writing/reading head according to claim 4, wherein the tapered surface is provided both on the leading side and on the trailing side of the main pole.

8. A writing/reading head according to claim 4, wherein a magnetic circuit is established from the main pole through the magnetic underlayer and into the auxiliary magnetic pole.

9. A writing/reading head according to claim 4, wherein the taper of said two side surfaces occurs in two stages, wherein in an upper taper portion (away from said air bearing surface), the two side surfaces are tapered a first amount, and
in a lower taper portion (between said upper taper portion and said air bearing surface, the two side surfaces are tapered substantially more than said first amount.

10. A writing/reading head, comprising:
a reading head; and
a single pole type recording head comprising a main pole and an auxiliary pole, wherein the main pole has a tapered surface on the leading side in the direction of the flying height as viewed from an air bearing surface, and wherein the tapered surface intersecting the air bearing surface, and the angle θ defined as θ=ArcTan (h/W) is between 45° and 75°, wherein h represents a projected length of a segment formed with the tapered surface in the direction of the flying height relative to the cross section and W represents a projected length of the segment to the air bearing surface of the main pole as viewed from the direction of the track.

11. A magnetic disk storage apparatus, comprising:
a single pole type recording head for recording on a perpendicular magnetic recording medium having a soft magnetic underlayer having
an auxiliary pole, and
a main pole including an upper, lower, and two lateral side surfaces, and further including an air bearing surface which is generally perpendicular to said upper, lower and two lateral side surfaces, said lower surface and upper surface defining a leading side and a trailing side of the main pole, respectively, wherein said two side surfaces of the main pole are tapered in the direction of the flying height as viewed from the air bearing surface, and further wherein said main pole is tapered in the direction of the flying height on the leading side as viewed from the air bearing surface; and
a perpendicular magnetic recording medium having a soft magnetic underlayer, wherein a magnetic circuit is established from the main pole through the magnetic underlayer and into the auxiliary magnetic pole.

12. A magnetic disk storage apparatus according to claim 11, wherein the angle formed between the air bearing surface and the tapered surface of the main pole is in the range the range of approximately 45° to 75°.

* * * * *